(12) United States Patent
Brocksopp

(10) Patent No.: US 6,695,047 B2
(45) Date of Patent: Feb. 24, 2004

(54) MODULAR TEMPERATURE CONTROL SYSTEM

(76) Inventor: Jon P. Brocksopp, P.O. Box 593, Racine, WI (US) 53401-0593

( * ) Notice: Subject to any disclaimer, the term of this patent is extended or adjusted under 35 U.S.C. 154(b) by 154 days.

(21) Appl. No.: 10/058,396

(22) Filed: Jan. 28, 2002

(65) Prior Publication Data

US 2003/0141050 A1 Jul. 31, 2003

(51) Int. Cl.[7] .............................. F01P 7/10; F01P 7/12
(52) U.S. Cl. ..................... 165/292; 165/299; 165/51; 165/140; 165/98; 165/41; 123/41.04; 123/41.06; 123/41.12; 123/41.49; 123/41.31; 123/41.33; 123/563; 60/599; 184/6.22; 184/6.12; 184/104.1; 74/606 A
(58) Field of Search ................................. 165/292, 299, 165/51, 140, 98, 99, 41; 123/41.48, 41.04, 41.05, 41.06, 41.49, 41.12, 41.31, 41.33, 563; 60/599; 184/6.12, 6.22, 104.1; 74/606 A

(56) References Cited

U.S. PATENT DOCUMENTS

| | | | | |
|---|---|---|---|---|
| 4,489,680 A | * | 12/1984 | Spokas et al. ............ | 123/41.49 |
| 4,546,742 A | * | 10/1985 | Sturges ..................... | 123/41.33 |
| 4,916,902 A | * | 4/1990 | Pratt et al. ..................... | 60/599 |
| 5,215,044 A | * | 6/1993 | Banzhaf et al. ........... | 123/41.33 |
| 5,937,979 A | * | 8/1999 | Cummings | |
| 6,129,056 A | * | 10/2000 | Skeel et al. ................... | 165/41 |
| 6,164,909 A | * | 12/2000 | Ehlers et al. .............. | 165/140 |
| 6,321,830 B1 | * | 11/2001 | Steinmann ................ | 165/51 |
| 6,354,096 B1 | * | 3/2002 | Siler et al. | |
| 6,401,801 B1 | * | 6/2002 | Dicke ........................ | 165/299 |

FOREIGN PATENT DOCUMENTS

| | | | |
|---|---|---|---|
| DE | 29504867 U | * | 7/1996 |
| DE | 19724728 A1 | * | 2/1999 |
| FR | 2784418 | * | 4/2000 |
| JP | 2000-130167 | * | 5/2000 |

* cited by examiner

Primary Examiner—John K. Ford
(74) Attorney, Agent, or Firm—Ron Brockman

(57) ABSTRACT

A temperature control system includes an enclosure having a plurality of adjoining walls. At least one inlet is disposed within at least one of the walls. The at least one inlet has an electrically controlled inlet fan associated with it. A plurality of outlet louver assemblies are disposed within at least an other wall and include a plurality of moveable louvers. An actuator is coupled with each outlet louver assembly to move the plurality of moveable louvers. An ambient air sensor is disposed within the enclosure for sensing the ambient temperature within the enclosure and providing an output signal which is conducted to an electrical processing circuit. Alternatively, the ambient air sensor may be located without the enclosure. Temperature sensors are also coupled with the engine, charge air and transmission cooler for sensing their respective temperatures and providing output signals which are conducted to the electrical processing circuit. The electrical processing circuit is coupled with the actuators and inlet fans and controls the movement of the plurality of louvers and inlet fans dependent upon the output signals from the temperatures sensors.

8 Claims, 2 Drawing Sheets

MODULAR TEMPERATURE CONTROL SYSTEM

BACKGROUND OF THE INVENTION

In the automotive industry, and particularly the bus industry, the use of radiators, charge air coolers and transmission heat exchange units are common place. In the conventional systems these heat exchangers are located within the engine compartment. This location is convenient, but exposes the exchangers to collection of debris that is kicked up by tires, particularly where the engine is rear mounted. In addition, the face area for the radiators is limited and the thickness of the exchangers required to obtain the necessary heat exchange surfaces pushes the exchangers to the limit of their capacity to exchange heat. Also heat exchange occurs in all of the exchangers regardless where the heat exchange is required. This causes substantial inefficiencies in the heat exchange, thereby increasing the energy required for heat exchange.

This invention uses a separate enclosure to house the heat exchangers and the devices to move air through the exchangers. This allows for a larger volume of air to be drawn through the cooling unit. In addition, in this invention each heat exchanger is associated with an outlet louver assembly which opens and closes the exchanger to moving air. Thus, the ambient air can be directed to the exchangers that require air movement through them for cooling. This serves several purposes. It allows for the efficient movement of air and minimizes the total volume of air moved while carrying out optimum cooling, thereby allowing for greater efficiency in the cooling system. Also the speed of the air moving devices is regulated according to the volume of air that is required to cause heat exchange. Consequently the energy required to cool is less than in conventional systems.

DISCLOSURE OF THE INVENTION

In one aspect of this invention a temperature control system includes an enclosure having a plurality of walls. At least one inlet is disposed in at least one of the walls. The at least one inlet has an electrically controlled inlet fan associated with it for drawing air through the inlet into the enclosure. A plurality of outlet louver assemblies are disposed within at least an other wall. A plurality of outlet louver assemblies are disposed within at least an other wall and include a plurality of louvers. An actuator is coupled with the outlet louver assembly to move the plurality of louvers. An ambient air sensor is disposed within the enclosure for sensing the ambient temperature within the enclosure and providing an output signal which is conducted to an electrical processing circuit. Temperature sensors are coupled with the engine, charge air and transmission for sensing their respective temperatures and providing output signals which are conducted to the electrical processing circuit. The electrical processing circuit is coupled with the actuators and inlet fans and controls the movement of the plurality of louvers and inlet fans dependent upon the output signals from the temperatures sensors.

An object of the invention is to provide for a temperature control system for automobiles, the system being located separate from the engine compartment.

Another object of the invention is to provide for a temperature control system which allow for the separate cooling of the engine, charge and transmission of automobiles.

Another object of the invention is to provide for an efficient temperature control system by directing the movement of the cooling air to heat exchangers which require heat exchange.

These and other objects of the invention will be apparent from the disclosure.

DETAILED DESCRIPTION OF THE PREFERRED EMBODIMENT OF THIS INVENTION

Figure 1:
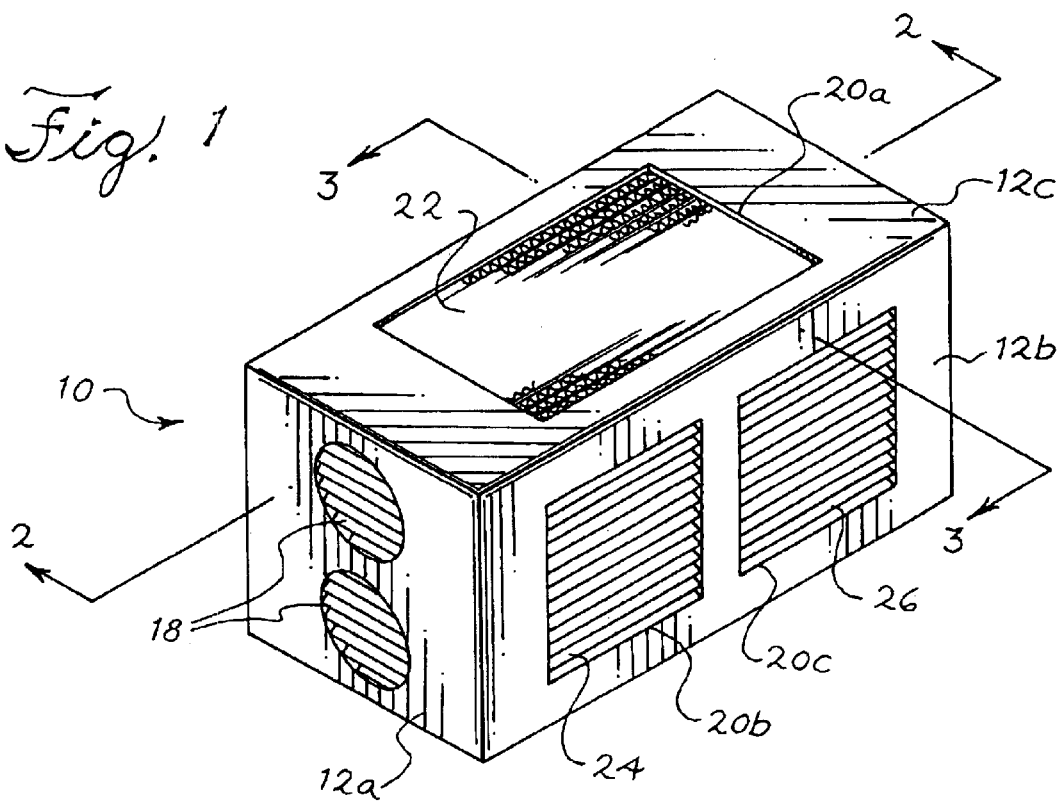
FIG. 1 is a top perspective schematic view of one embodiment of the enclosure of this invention.

Referring to FIG. 1 there is shown an embodiment of a temperature control system 10 of the present invention for controlling the temperature of engines, charge air and transmissions in automobiles not shown) and more particularly busses with rear engines. The temperature control system 10 includes an enclosure with a plurality of adjoining walls 12. In FIG. 1 the enclosure 10 has six walls 12. FIG. 1 shows two inlets 18 on a side wall 12a. The top wall 12c has an outlet 20a which exposes a transmission heat exchanger 22. The rear wall 12b (in the foreground of the figure) has two outlets 20b and 20c, one of which is associated with an engine radiator 24 and the other with a charge air cooler 26. The radiator 24, charge air cooler 26 and transmission heat exchanger 22 are connected to the respective parts of the motor and transmission by means not shown in the figure. At least one air transport device in the form of a fan 30 is positioned within the enclosure at the inlet 18 (not shown in FIG. 1).

Figure 2:
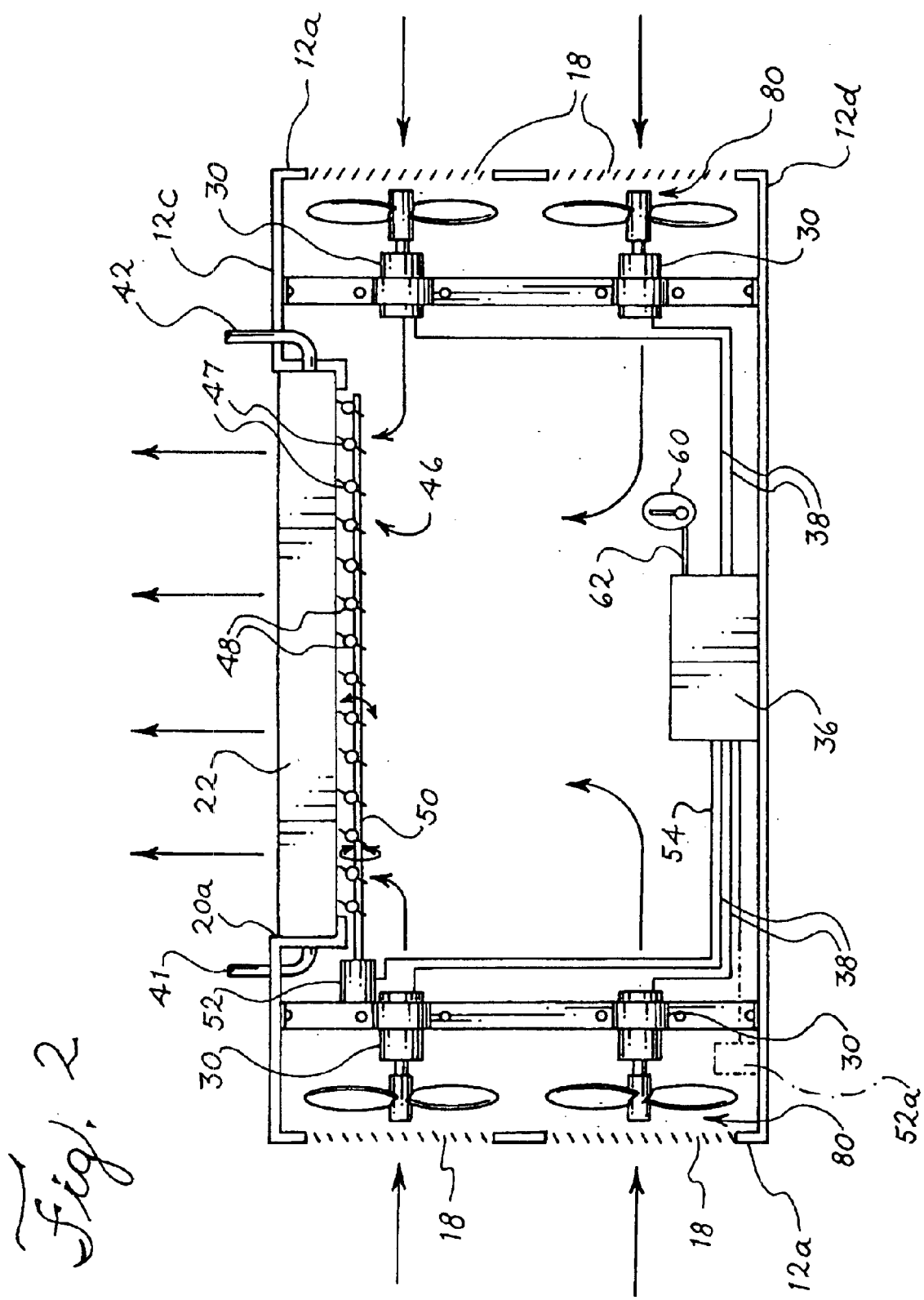
FIG. 2 is a cross-sectional schematic view of an embodiment of this invention.

FIG. 2 is a schematic cross sectional representation of the invention. The inlets 18 in the side walls 12a and outlet 20a on the top wall 12c are shown. Electrically driven intake fans 30 are located within the enclosure in association with the inlets 18 and are mounted on enclosure walls 12c and 12d. The intake fans 30 are connected to a controller 36 by conductors 38. Adjacent to the outlet 20a in the top wall 12c is the transmission heat exchanger 22. The transmission heat exchanger 22 has a fluid inlet 41 and fluid outlet 42 which are connected to the transmission (not shown). A louver outlet assembly 46 with a plurality of louvers 47 which are known in the art is shown. It is located immediately below the transmission heat exchanger 22. The plurality of louvers 47 run perpendicular to the drawing. They are pivotally mounted at each end by pivot pins 48 which are held within the outlet louver assembly 46. Each outlet louver 47 is pivotally connected to a common shaft 50 which allows all of the outlet louvers 47 to be moved simultaneously. The common shaft 50 is connected to an actuator 52 which is capable of moving the louvers. The common shaft 50 is capable of moving in opposite linear directions as shown by a double headed arrow. The actuator 52 in turn is connected to a controller 36 by a conductor 54. Louvers 47 are known in the art and any louver assembly could work. Single headed arrows show the direction of ambient air flow when the fans 30 are operating and the plurality of louvers 47 associated with the transmission heat exchanger 22 are open. The radiator 24 and charge air cooler 26 (not shown in FIG. 2) are associated with outlets 20 and louver assemblies 46 in the same manner as the transmission heat exchanger 22. A similar louver assembly (not shown) may be associated with the inlet such that the louvers are closed when its respective fan 30 is not operating and open when the fan 30 is operating.

In the example a transmission temperature sensor is located within the transmission (not shown), but it may be located with the inlet line (not shown) of the heat exchanger 22. It is connected to a controller 36 by a conductor (not shown). An ambient air sensor 60 is shown within the enclosure 10 and connected to the controller 36 by a conductor 62. It is not necessary for the ambient air temperature sensor 62 to be located within the enclosure. It may, for example, be located within the engine compartment (not shown). An engine temperature sensor is located within the engine (not shown) and is connected to the controller 36 by a conductor (not shown). Similarly, a charge air temperature sensor is located within the engine (not shown) and is connected to the controller 36 by a conductor (not shown).

Figure 3:
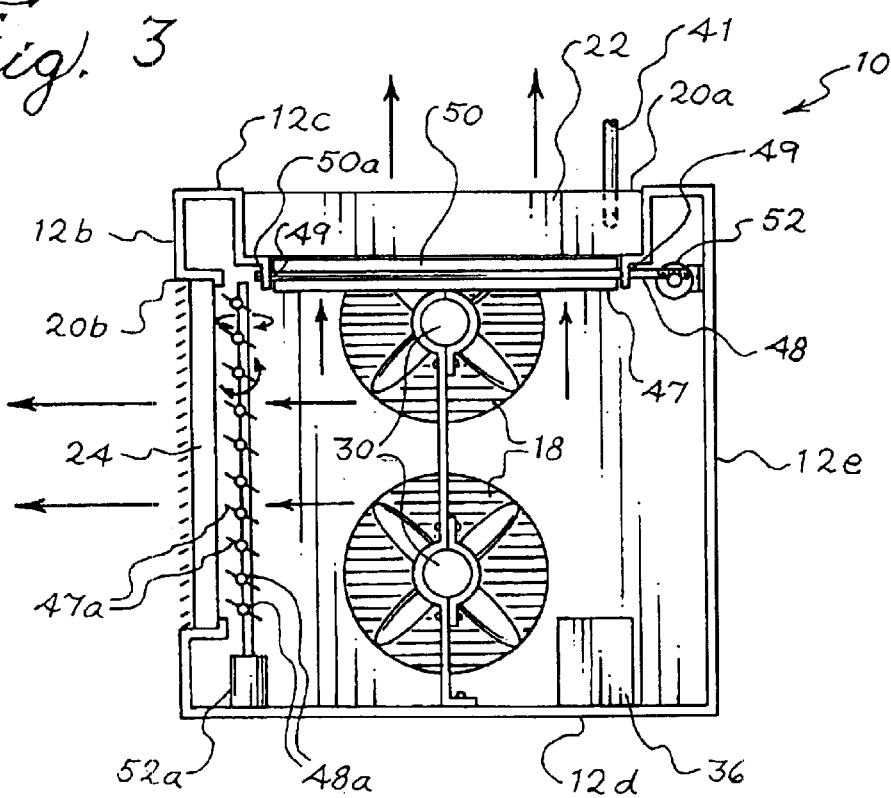
FIG. 3 is a cross-sectional schematic view of an embodiment of this invention. It is ninety degrees to the view shown in FIG. 2.

Referring to FIG. 3 another cross-sectional view of an embodiment of this invention is shown. The enclosure 10 is shown with its top wall 12a, bottom wall 12d, front wall 12e and rear wall 12b. The cross-section shows the transmission heat exchanger 24 which is associated with opening 20b. A louver outlet assembly 46 with moveable louvers 47a is associated with the exchanger 24. The moveable louvers 47a are moveable by means known in the art and as described above.

In operation the plurality of inlet fans 30 draw ambient air into the enclosure 10. The speed of fans 30 is dependent upon the amount of air required for heat exchange in the radiator 24, charge air cooler 26 and transmission heat exchanger 22. When the requirement for heat exchange is low the fans 30 will operate at a low speed and conversely at a high speed when the air volume required for heat exchange is high. Similarly, the outlet louvers 47 will be open or closed depending on the need for heat exchange in their respective heat exchangers. This is determined by the controller 36 by means known in the art.

In another embodiment each inlet fan 30 may be associated with an inlet louver assembly with moveable louvers (not shown) and coupled with the controller 36 such that when air volume for heat exchange is low some fans will not operate and their respective louvers will be closed by means known in the art.

I claim:

1. A temperature control system for use in automobiles and more particularly buses for cooling an engine, charge air for a turbo charger and a transmission, the temperature control system comprising:

an enclosure having a plurality of adjoining walls with at least one inlet disposed within at least one of the walls;

an electrically driven intake fan located within the enclosure and in association with the at least one inlet such that in operation the fan can draw ambient air through the at least one inlet;

a plurality of three outlet louver assemblies disposed within at least one of the walls without the at least one inlet, the outlet louver assemblies including a plurality of moveable outlet louvers;

a plurality of actuators in association with each moveable louver for moving the moveable louvers;

a plurality of heat exchangers including an engine radiator, charge air cooler and transmission heat exchanger associated with the engine, turbo charger and transmission, respectively, arranged within the enclosure and associated with the plurality of outlet louver assemblies such that each heat exchanger has its own outlet louver assembly;

an ambient air temperature sensor for sensing the ambient air temperature and providing an output signal;

an engine temperature sensor coupled with the automobile engine for sensing the temperature within the engine and providing an output signal;

a charge air temperature sensor coupled with the turbo charger for sensing the temperature of the charge air and providing an output signal;

a transmission temperature sensor coupled with the transmission for sensing the temperature of the transmission and providing an output signal;

an electrical processing circuit coupled with the air temperature sensor, engine temperature sensor, charge air temperature sensor and transmission temperature sensor the plurality of actuators and the at least one electrically driven intake fan, the electrical processing circuit variably controlling the speed of the electrically driven intake fan and the movement of the plurality of outlet louver assemblies upon the output signal from the ambient air temperature sensor and the respective temperature sensors from any of the engine, charge air and transmission;

the electrical processing circuit overriding the variable control of the respective actuators when the respective temperature of any of the engine, charge air and transmission exceeds a respective maximum threshold value and thereby causing the respective actuator to move the respective outlet louver to a full open position and overriding the variable control of the actuator of the at least one electrically driven intake fan when the temperature of any of the engine, charge air and transmission exceeds a respective maximum threshold value causing the intake fan to circulate air through the enclosure.

2. The temperature control system of claim 1 wherein two opposing walls of the enclosure each have two inlets and an electronically driven intake fan is associated with each inlet.

3. The temperature control system of claim 1 wherein the enclosure has six walls, including two opposing side walls, a rear wall, a front wall, a top wall and a bottom wall and the heat exchange units an ranged such that the transmission heat exchanger is located along the top wall, and the charge air cooler and radiator are arranged side by side along the rear wall, and each of the opposing side walls have two inlets and associated electrically driven intake fans.

4. The temperature control system of claim 1 wherein the engine temperature sensor for sensing a temperature of engine senses the temperature of cooling fluid within the engine.

5. The temperature control system of claim 1 wherein the transmission temperature sensor senses a temperature of transmission oil within the transmission.

6. The temperature control system of claim 1 wherein the electrical processing circuit comprises an electrical controller.

7. The temperature control system of claim 6 wherein the electrical controller comprises a proportional integral derivative controller.

8. A temperature control system for use in automobiles, and more particularly buses, for cooling an engine, charge air for a turbo charger and a transmission comprising:

an enclosure having a plurality of adjoining walls, at least one inlet disposed within at least one of the walls;

an inlet louver assembly being associated with the at least one inlet, the inlet louver assembly including a plurality of moveable louvers;

an electrically driven intake fan located within the enclosure and in association with the at least one inlet such that in operation the fan can draw ambient air through the at least one inlet;

a plurality of three outlet louver assemblies disposed within at least one of the walls without the at least one inlet, the outlet louver assemblies including a plurality of moveable outlet louvers;

a plurality of actuators, in association with each moveable louver for moving the moveable louvers;

an ambient air temperature sensor for sensing the ambient air temperature and providing an output signal;

an engine temperature sensor coupled with the automobile engine for sensing the temperature within the engine and providing an output signal;

a charge air temperature sensor coupled with the turbo charger for sensing the temperature of the charge air and providing an output signal;

a transmission temperature sensor coupled with the transmission for sensing the temperature of the transmission and providing an output signal;

a plurality of heat exchangers including an engine radiator, charge air cooler and transmission heat exchanger arranged within the enclosure and associated with the plurality of outlet louver assemblies such that each exchanger has its own outlet louver assembly;

an electrical processing circuit coupled with the air temperature sensor, engine temperature sensor, charge air temperature sensor and transmission temperature sensor, the plurality of actuators and the a least one electrically driven intake fan, the electrical processing circuit variably controlling the speed of the electrically driven intake fan, the inlet louver assembly and the movement of the plurality of outlet louver assemblies upon the output signal from the ambient air temperature sensor and the respective temperature sensors from any of the engine, charge air and transmission;

the electrical processing circuit overriding the variable control of the respective actuators when the respective temperature of any of the engine, charge air and transmission exceeds a respective maximum threshold value and thereby causing the respective actuator to move the respective outlet louver to a full open position and overriding the variable control of the actuator of the at least one electrically driven intake fan when the temperature of the any of the engine, charge air and transmission exceeds a respective maximum threshold value causing the intake fan to circulate air through the enclosure.

* * * * *